United States Patent
Takai et al.

(10) Patent No.: US 9,364,992 B2
(45) Date of Patent: Jun. 14, 2016

(54) THERMOFORMING DEVICE AND THERMOFORMING METHOD USING HOT PLATE HEATING

(75) Inventors: Toshihiro Takai, Aichi-gun (JP); Kenichi Mizoguchi, Aichi-gun (JP); Hideki Usami, Aichi-gun (JP); Kazunori Teramoto, Aichi-gun (JP)

(73) Assignee: Asano Laboratories Co., Ltd., Aichi (JP)

( * ) Notice: Subject to any disclaimer, the term of this patent is extended or adjusted under 35 U.S.C. 154(b) by 1043 days.

(21) Appl. No.: 13/505,373

(22) PCT Filed: Jun. 25, 2010

(86) PCT No.: PCT/JP2010/004236
§ 371 (c)(1),
(2), (4) Date: May 1, 2012

(87) PCT Pub. No.: WO2011/080850
PCT Pub. Date: Jul. 7, 2011

(65) Prior Publication Data
US 2012/0211928 A1 Aug. 23, 2012

(30) Foreign Application Priority Data
Dec. 28, 2009 (JP) .................................. 2009-297489

(51) Int. Cl.
*B29C 51/10* (2006.01)
*B29C 51/42* (2006.01)
*B29C 51/16* (2006.01)

(52) U.S. Cl.
CPC ............... *B29C 51/10* (2013.01); *B29C 51/421* (2013.01); *B29C 51/165* (2013.01); *B29C 2791/006* (2013.01); *B29C 2791/007* (2013.01)

(58) Field of Classification Search
CPC ...................................................... B29C 51/40
See application file for complete search history.

(56) References Cited

FOREIGN PATENT DOCUMENTS

| DE | 102005061315 A1 | 6/2007 |
|---|---|---|
| JP | 05031743 A * | 2/1993 |
| JP | 3102916 B | 8/2000 |

(Continued)

OTHER PUBLICATIONS

International Search Report issued in International Patent Application No. PCT/JP2010/004236, mailed Jul. 20, 2010, 2 pages.

(Continued)

*Primary Examiner* — Monica Huson
(74) *Attorney, Agent, or Firm* — Wood, Herron & Evans, LLP (57) ABSTRACT

A thermoforming device using a hot plate heating includes a frame; a hot plate; a decompression unit connected to the frame; a decompression unit which is connected to a hot plate; a unit which is connected to the hot plate and opens a heating surface side to an atmosphere or pressures the heating surface side; an adsorption and heating control unit which performs the adsorption and heating operation of the sheet by the hot plate; a decompression control unit which performs a decompression operation in the concave portion; and a molding operation control unit which concurrently performs the adsorption and heating operation and the decompression operation, stops the adsorption and heating operation of the sheet after a predetermined time from the start of the operation, and opens a portion between the hot plate and the sheet to the atmosphere or pressures the portion.

4 Claims, 4 Drawing Sheets

(56) References Cited

FOREIGN PATENT DOCUMENTS

| JP | 2006346979 A | 12/2006 |
|----|--------------|---------|
| JP | 2007230010 A | 9/2007  |

OTHER PUBLICATIONS

European Patent Office Search Report issued in European Patent Application No. 10840713.1, mailed Jul. 11, 2013, 8 pages.

* cited by examiner

FIG. 4C

# THERMOFORMING DEVICE AND THERMOFORMING METHOD USING HOT PLATE HEATING

TECHNICAL FIELD

The present invention relates to a thermoforming device and a thermoforming method using a hot plate heating for thermoforming a sheet to bond the sheet to a shaping mold or a base material.

Priority is claimed on Japanese Patent Application No. 2009-297489, filed Dec. 28, 2009, the content of which is incorporated herein by reference.

BACKGROUND ART

In the related art, a vacuum press laminate molding device is known as a device which bonds a sheet (an epidermal sheet) to an outer surface of a molding base material (for example, see Patent Document 1).

Figure 4A:
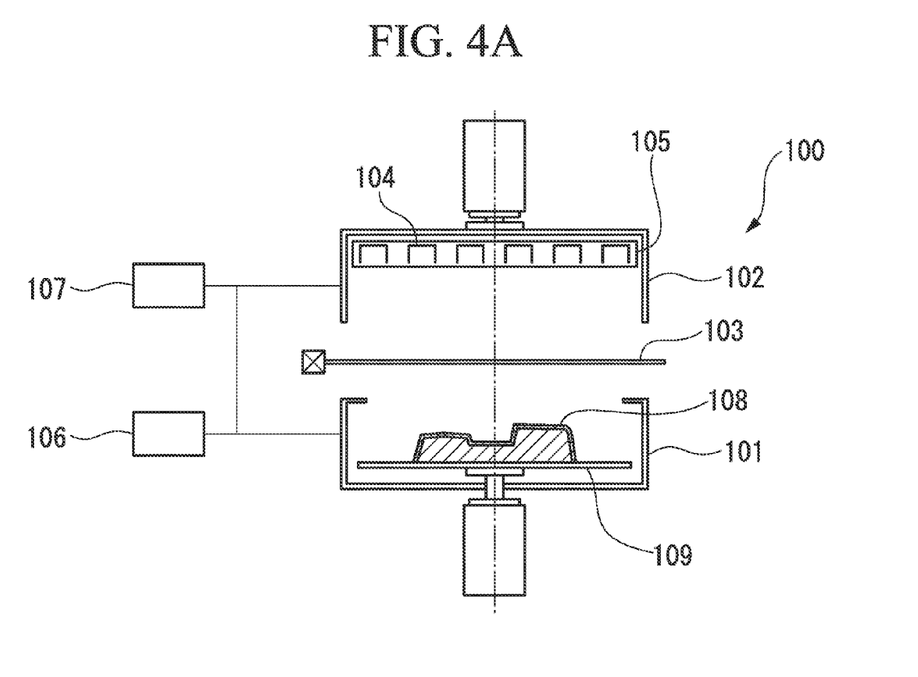
FIG. 4A is a view that shows an operation sequence of a thermoforming method using a thermoforming device of the related art.
Figure 4B:
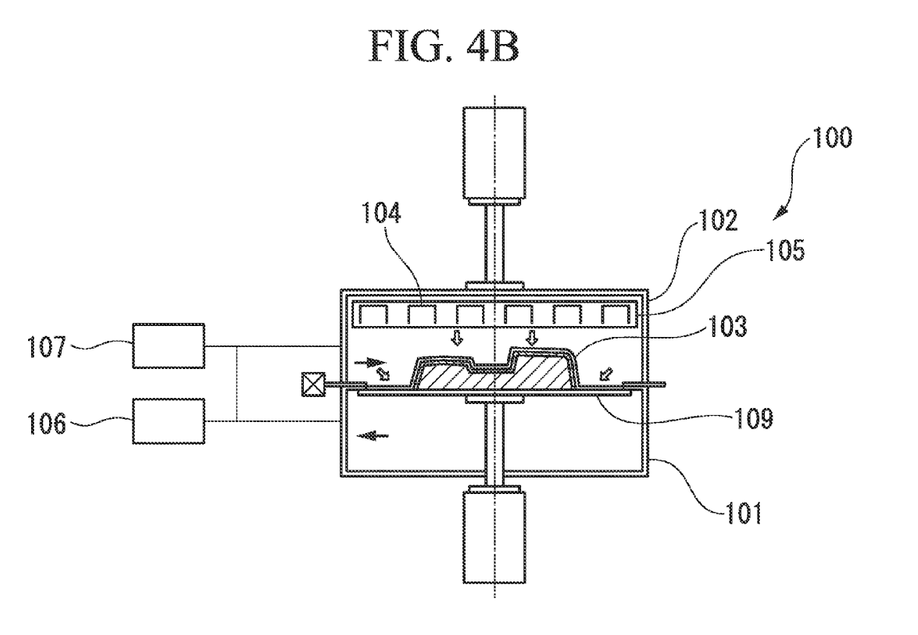
FIG. 4B is a view that shows an operation sequence of the thermoforming method followed by FIG. 4A.
Figure 4C:
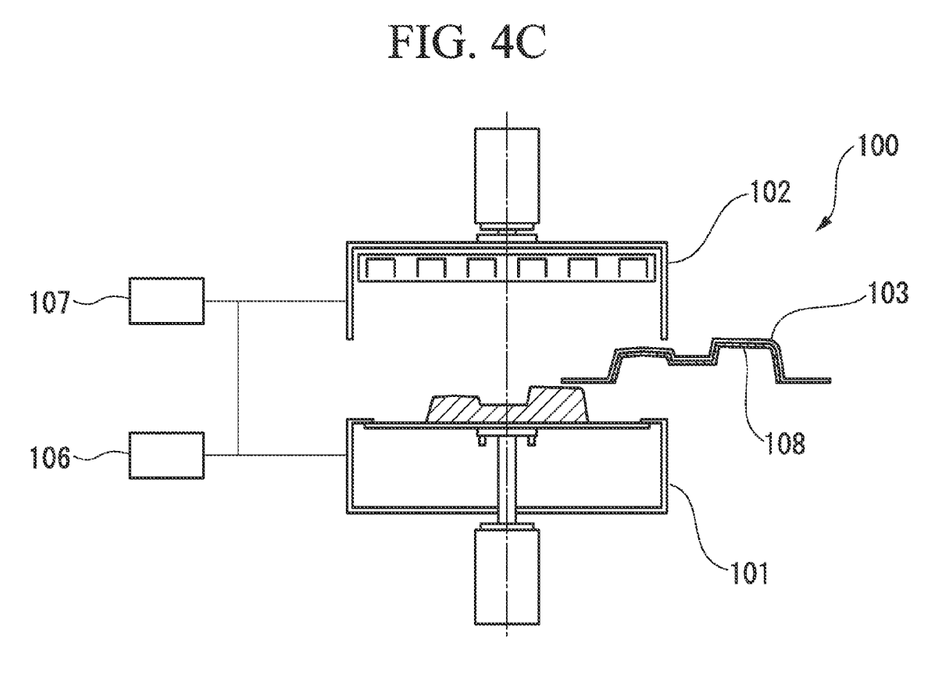
FIG. 4C is a view that shows an operation sequence of the thermoforming method followed by FIG. 4B.

FIGS. 4A to 4C show a thermoforming device 100 of the related art according to Patent Document 1. As shown in FIGS. 4A to 4C, the thermoforming device 100 according to Patent Document 1 includes upper and lower chambers 101 and 102. The lower chamber 101 accommodates the molding base material and is able to set a sheet 103 in a periphery portion of the upper chamber 102 side. The upper chamber 102 has a hot plate 105 which includes a heater 104 in an upper part thereof. The upper chamber 102 is connected to a vacuum tank 106 and a pressurization tank 107, and is able to evacuate and pressurize the inside of the chamber 102. The lower chamber 101 is connected to the vacuum tank 106 and is able to evacuate the inside of the chamber 101.

In addition, as a molding method using the thermoforming device 100, firstly, as shown in FIG. 4A, a base material 108 and the sheet 103 are set on the lower chamber 101, the upper chamber 102 is lowered, and the upper and lower chambers 101 and 102 are set to an airtight state in an atmospheric state. Next, as shown in FIG. 4B, the inner portions of the upper and lower chambers 101 and 102 are set to a vacuum state, and the sheet 103 is heated by the heater 104 of the upper chamber 102. Moreover, a table 109 in the lower chamber 101 is raised and only the inner portion of the upper chamber 102 is set to an atmospheric pressure state, whereby the sheet 103 is pressed against the base material 108 (a mold) and is molded. At this time, by supplying compressed air into the upper chamber 102, adsorptive force of the sheet 103 relative to the base material 108 (the mold) may be increased. Next, as shown in FIG. 4C, a mold release is performed by making the inner portion of the upper chamber 102 a partial vacuum state, and the thermoforming is performed by taking out the base material 108.

PRIORITY DOCUMENT

Patent Document

[Patent Document 1] Japanese Patent No. 3102916

DISCLOSURE OF INVENTION

Problems to be Solved by the Invention

However, the thermoforming method of the related art has problems as below.

That is, a growth of the sheet occurs by the softening of the sheet due to the heating, but, since the heating method is radiation heating in the chamber, there is a need to suppress drooping due to the growth. Thus, the vacuum pressure adjustment in the upper and lower chambers and an operation for keeping the sheet in a horizontal state are performed. However, since it is difficult to confirm the correct amount of growth of the sheet, the temperature distribution over the entire sheet becomes non-uniform, reliable molding and bonding cannot be obtained, and a stable quality cannot be obtained. In addition, there is a problem in that a position deviation of a printing sheet to the shape of the base material is generated.

Furthermore, after the sheet is heated, when the inner portion of the lower chamber becoming the base material side is decompressed, the sheet is moved to the base material side and is bonded to the base material according to the decompression speed, and thus there is a possibility that the pressing force of the sheet relative to the base material is insufficient. For that reason, when a complex convex and concave shape is present in an external form of the base material, if the pressing force of the sheet relative to the base material is insufficient, air stays between the concave and convex portion and the sheet, which leads to the degradation of the quality.

In addition, in the thermoforming by the upper and lower chambers of the related art, there are problems in that, since the volume of the chamber is large, the decompression takes time, a cycle time becomes longer, and a molding efficiency declines. Thus, improvement was necessary.

The present invention has been made in view of the problems mentioned above, and an object thereof is to provide a thermoforming device and a thermoforming method using a hot plate heating which can realize high-quality molding regardless of the shape of the base material and are suitable for the positioning of the printing sheet relative to the shape of the base material.

Furthermore, another object of the present invention is to provide a thermoforming device and a thermoforming method using a hot plate heating which can reduce a cycle time required for the molding to promote the efficiency of the molding by reducing the decompression time and can improve the productivity.

Means for Solving the Problems

In order to achieve the objects mentioned above, the present invention adopts a configuration as below.

A thermoforming device using a hot plate heating according to an aspect of the present invention includes a frame which has a base portion, a peripheral wall portion erected on a periphery of the base portion, and a concave portion formed by the base portion and the peripheral wall portion; a hot plate which has a heating surface facing the concave portion of the frame and a heating unit that heats the heating surface; a decompression unit which is connected to the frame, fixes a sheet to an upper end of the peripheral wall portion of the frame, and decompresses an inner portion of the concave portion covered by the sheet; a decompression unit which is connected to the hot plate and sucks the heating surface side; a unit which is connected to the hot plate and opens the heating surface side to an atmosphere or pressures the heating surface side; an adsorption and heating control unit which performs the adsorption and heating operation of the sheet by the hot plate in a state in which the frame and the hot plate come into close contact with each other with the sheet interposed therebetween; a decompression control unit which performs a decompression operation by the decompression unit in the concave portion covered by the sheet; and a molding operation control unit which concurrently performs the adsorption and heating operation by the adsorption and heating control unit and the decompression operation by the decompression control unit, stops the adsorption and heating operation of the sheet by the hot plate after a predetermined time from the start of the operation, and opens a portion between the hot plate and the sheet to the atmosphere or pressures the portion.

According to another aspect of the present invention, there is provided a thermoforming method using a hot plate heating which places a sheet between a frame having a peripheral wall portion and a concave portion surrounded by the peripheral wall portion and a hot plate having a heating surface facing the concave portion of the frame to thermoform the sheet, in which the method includes a first process of providing the sheet on an upper end of the peripheral wall portion of the frame and bringing the hot plate into close contact with the frame with the sheet interposed therebetween; a second process of decompressing a portion between the hot plate and the sheet and adsorbing the sheet onto the heating surface and heating the sheet; a third process of decompressing an inner portion of the concave portion covered by the sheet together with the second process; and a fourth process of stopping the adsorption of the sheet in the state of maintaining the decompression operation of the third process and opening the portion between the hot plate and the sheet to the atmosphere or pressuring the portion.

Furthermore, in the thermoforming device using the hot plate heating according to the aspect of the invention, it is preferable that a ventilation hole be provided in the outer peripheral portion of the base portion of the frame.

Furthermore, in the thermoforming device using the hot plate heating according to the aspect of the invention, it is preferable that the heating unit be a heater provided on an opposite side of the heating surface of the hot plate.

Furthermore, in the thermoforming method using the hot plate heating according to the aspect of the invention, it is preferable that, in the third process, before decompressing the inner portion of the concave portion, the inner portion of the concave portion covered by the sheet be pressured.

Effects of Invention

According to the thermoforming device and the thermoforming method using the hot plate heating according to the aspect of the present invention, by raising the movement speed of the sheet toward the base material side immediately after stopping the adsorption and heating operation by the hot plate, the pressing force of the sheet relative to the base material can be increased. Thus, even when the base material has complex external convex and concave forms, air does not stay between the concave and convex portions and the sheet, the reliable bonding is performed, the high quality molding can be realized irrespective of the shape of the base material, and it is possible to more suitably perform the positioning of the printing sheet relative to the shape of the base material.

Furthermore, with the configuration in which the hot plate is brought into close contact with the sheet, there is no need for an upper chamber unlike the related art, and the decompression time can be reduced. Thus, the cycle time taken for the molding can be reduced to promote the efficiency of the molding, whereby the productivity can be improved.

DETAILED DESCRIPTION OF THE EMBODIMENTS

Hereinafter, a thermoforming device and a thermoforming method using a hot plate heating according to an embodiment of the present invention will be described based on the drawings.

Figure 1:
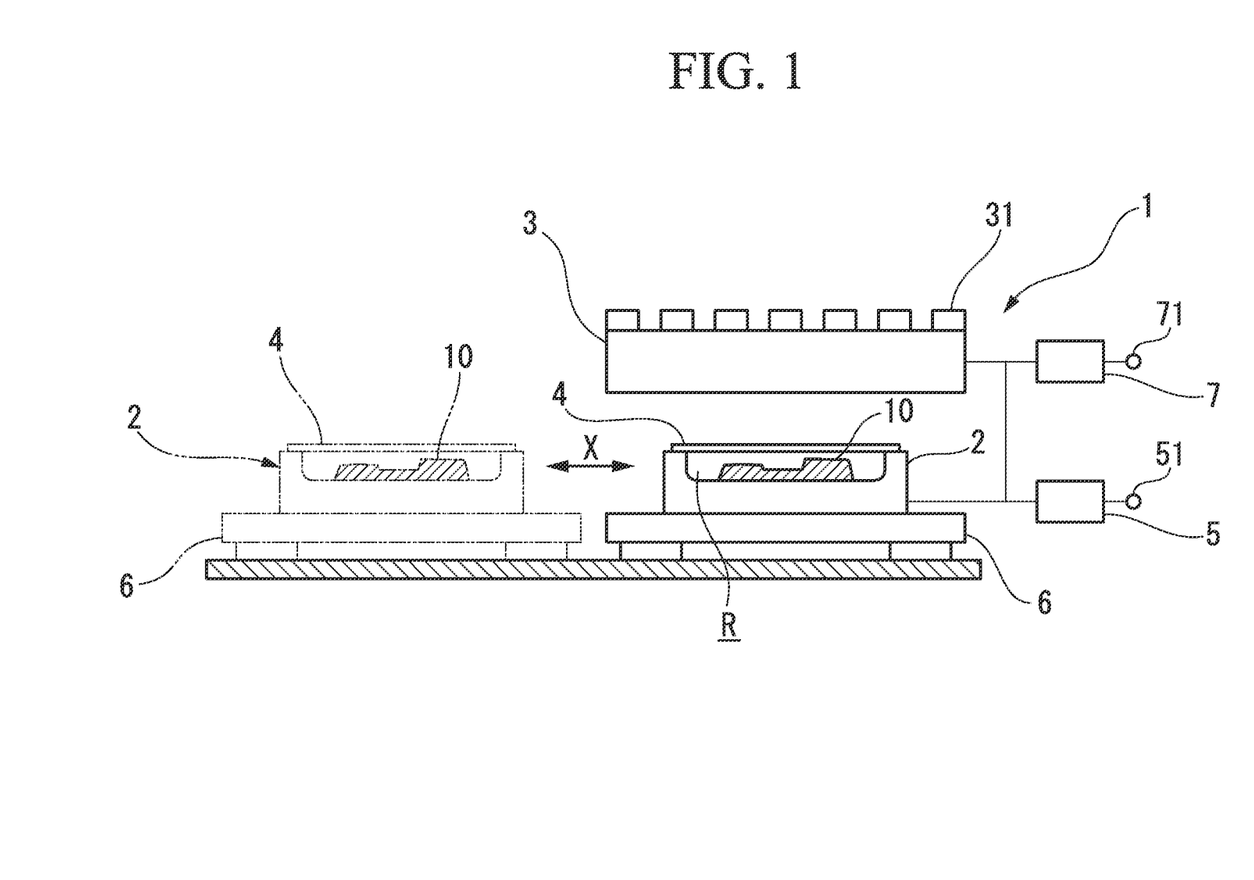
FIG. 1 is a view shows a schematic configuration of a thermoforming device according to an embodiment of the present invention.

As shown in FIG. 1, a thermoforming device 1 using a hot plate heating according to the present embodiment includes a lower frame 2 which has a space (an accommodation space R) capable of accommodating a base material 10, and a hot plate 3 which is able to bring a heating surface 3a (FIG. 2) thereof into close contact with a frame upper edge portion 2a (FIG. 2) of the lower frame 2. A sheet 4 made of a resin is placed between the lower frame 2 and the hot plate 3, and the sheet 4 is thermoformed by the hot plate 3 and is bonded to the base material 10. In addition, in the present embodiment, the molding by the base material bonding is an application target.

In the present embodiment, the lower frame 2 and the hot plate 3 are placed up and down, and the hot plate 3 is placed above the lower frame 2.

Figure 2:
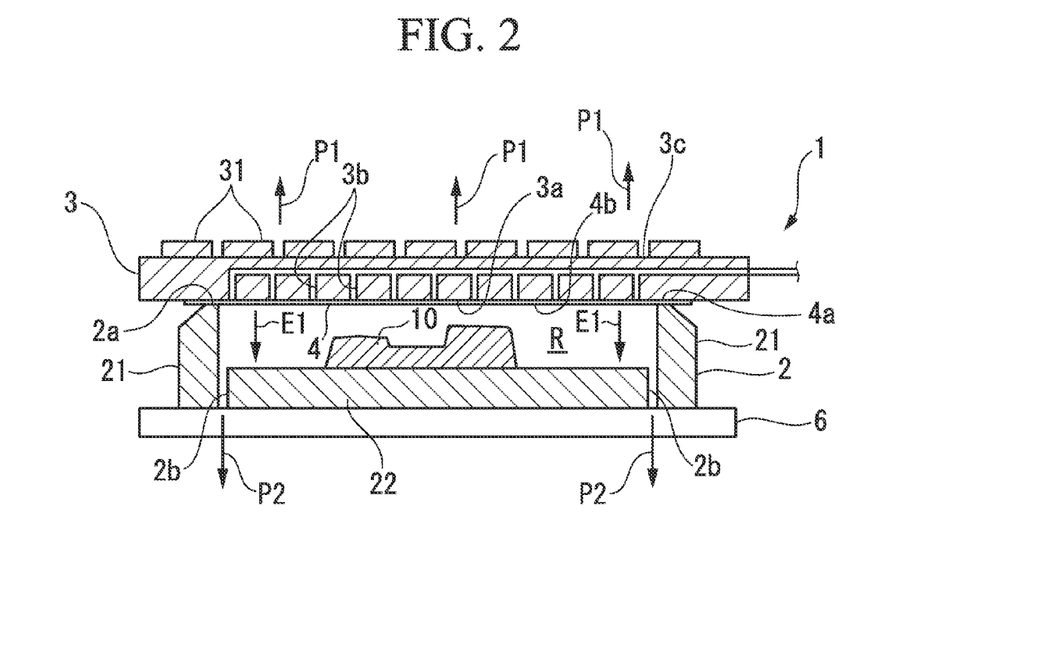
FIG. 2 is a side cross-sectional view that shows an operation sequence of the thermoforming method using a thermoforming device shown in FIG. 1.

As shown in FIG. 2, the lower frame 2 is formed of a metallic member, and a peripheral wall portion 21 is erected on an outer periphery thereof. All sides of the lower frame 2 are surrounded by the peripheral wall portion 21 when viewed from a plane to form the accommodation space R. On the peripheral wall portion 21 side (outer periphery side) of a bottom portion (a base portion) 22 of the lower frame 2, a plurality of ventilation holes 2b and 2b is formed which communicates with the accommodation space R. As shown in FIG. 1, the ventilation hole 2b is connected to a vacuum tank 5 (a decompression unit) including a vacuum pump 51 and can decompress the accommodation space R by driving the vacuum pump 51 to perform the vacuum suction during molding. As shown in FIG. 2, it is possible to fix the sheet 4 to an upper end (a top surface; a frame upper edge portion 2a) of the peripheral wall portion 21 of the lower frame 2 so as to block an opening of the accommodation space R.

Furthermore, the lower frame 2 is provided on a stand 6 capable of sliding on a floor and is able to advance or retreat with respect to a molding position at a lower side of the hot plate 3. Herein, the molding position at the lower side of the hot plate 3 is a molding position of the base material 10 side accommodated in the lower frame 2.

The hot plate 3 has a flat plate shape in which the heating surface 3a at the lower frame 2 side has a smooth flat surface, and forms a shape greater than that of the lower frame 2 when viewed from the plane. Moreover, the hot plate 3 is provided so as to approach or be separated from the lower frame 2 placed at the molding position of the lower side in a vertically movable manner, and is placed so as to come into close contact with the frame upper edge portion 2a of the lower frame 2 in the state when being moved to the lower side.

The hot plate 3 is configured so that an upper surface 3c (an opposite side of the lower frame 2 side) side thereof is provided with a plurality of heaters 31 and 31 (heating units) and a plurality of ventilation holes 3b communicating with the heating surface 3a at the lower frame 2 side is provided. As shown in FIG. 1, the ventilation holes 3b are connected to the vacuum tank 5 (a decompression unit) including the vacuum pump 51 performing the vacuum suction of the heating surface 3a side and a pressurization tank 7 (a pressure unit) accumulating the compressed air by a compressor 71. That is, by providing the vacuum tank 5, a decompression loss can be reduced.

By providing the decompression and pressure unit, during thermoforming, it is possible to open the vacuum tank 5 kept in the vacuum state to perform the vacuum suction from the lower frame 2 side or supply the compressed air from the pressurization tank 7 and apply pressure to the accommodation space R side from the heating surface 3a.

Herein, the vacuum degree may be increased by the direct suction by driving the vacuum pump 51 without providing the vacuum tank 5.

In addition, although it is not particularly shown, an "atmosphere opening unit (unit opened to the atmosphere)" in the present embodiment is a unit which opens an inner space of a portion (an interval) between the hot plate 3 and the upper surface of the sheet 4 to the atmosphere by stopping the vacuum suction from the vacuum tank 5. That is, since the space of the lower surface 4b side (the base material 10 side) of the sheet 4 is in the vacuum state, the atmosphere opening unit is a unit which generates a pressure difference between the upper and lower spaces with the sheet 4 interposed therebetween by opening the space of the upper surface side (an opposite side of the base material 10 side) of the sheet 4 to the atmosphere. For that reason, a switch or an electric circuit for switching the vacuum suction operation of the vacuum tank 5 from ON to OFF corresponds to the "atmosphere opening unit" according to the present embodiment.

The sheet 4 is configured so that an outer periphery portion 4a thereof is fixed to the frame upper edge portion 2a of the lower frame 2 by a fixing member (not shown) in a horizontal state. The base material 10 side (the lower surface 4b side) of the sheet 4 is a bonding layer and a gap is formed between the lower surface 4b and the base material 10 in the state of being fixed to the lower frame 2. In addition, if the gap between the base material 10 and the hot plate 3 (the sheet 4) is, for example, about 5 mm, the molding is possible, and the concave portion (the accommodation space R) of the lower frame 2 can be minimized by reducing the gap.

Moreover, the thermoforming device 1 has a molding operation unit (not shown) which concurrently performs the adsorption and heating operation by the hot plate 3 and the decompression operation in the accommodation space R of the lower side of the sheet 4 in the state of bringing the lower frame 2 into close contact with the hot plate 3 with the sheet 4 interposed therebetween, stops the adsorption operation by the hot plate 3 after a predetermined time from the operation starting, and opens the portion between the hot plate 3 and the sheet 4 to the atmosphere or pressures (compresses) the portion. In addition, although it is not particularly shown, the molding operation unit includes a control circuit for performing the operation mentioned above.

Next, a thermoforming method will be described based on the drawings.

Firstly, as shown in FIG. 1, a first process (a member placing process) is performed in which the sheet 4 is placed on the frame upper edge portion 2a of the lower frame 2 and the hot plate 3 is brought into close contact with the lower frame 2.

That is, the base material 10 is set in the accommodation space R of the lower frame 2, and the sheet 4 is fixed on the frame upper edge portion 2a of the peripheral wall portion 21 of the lower frame 2 so as to block the opening of the accommodation space R. Moreover, as shown in FIG. 2, the lower frame 2 with the base material 10 set therein is moved to a molding position at the lower side of the hot plate 3. After that, the hot plate 3 is moved downward until the outer periphery portion of the heating surface 3a is brought into close contact with the frame upper edge portion 2a of the lower frame 2. At this time, the sheet 4 is placed along the heating surface 3a of the hot plate 3 in an almost contact state, and the outer periphery portion 4a thereof is interposed by the lower frame 2 and the hot plate 3. In the present embodiment, after moving the lower frame 2 toward the hot plate 3, the hot plate 3 is moved toward the lower frame 2, whereby the adherence between the lower frame 2 and the hot plate 3 is realized, but the present invention is not limited thereto. After moving the hot plate 3 toward the lower frame 2, the lower frame 2 is moved toward the hot plate 3, whereby the adherence between the lower frame 2 and the hot plate 3 may be realized. Any one of the lower frame 2 and the hot plate 3 may be moved to realize the adherence, and both of them may be concurrently moved to realize the adherence.

Figure 3:
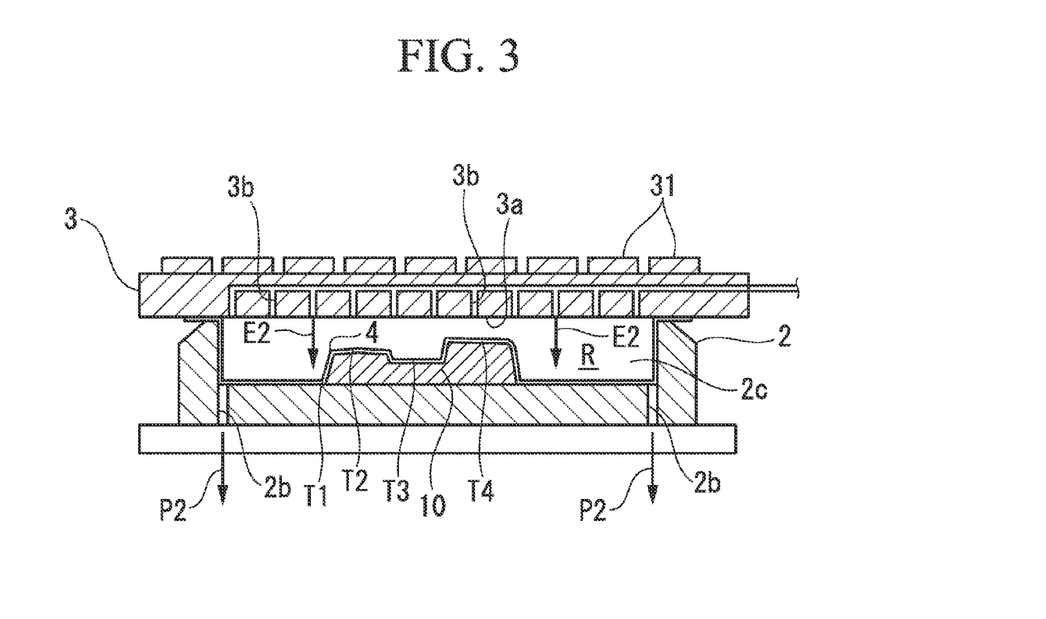
FIG. 3 is a side cross-sectional view that shows an operation sequence of the thermoforming method followed by FIG. 2.

Next, as shown in FIGS. 2 and 3, a second process (a decompression and heating process) is performed in which a portion between the hot plate 3 and the sheet 4 is decompressed and the sheet is sucked and heated to the heating surface 3a, thus the sheet is heated. Along with the second process, a third process (a decompression process of the accommodation space) is performed which depresses the accommodation space R of the lower side of the sheet 4.

Specifically, the hot plate 3 is heated by the heater 31, and the vacuum tank 5 shown in FIG. 1 is opened with respect to the hot plate 3. By performing the vacuum suction to a direction (an arrow P1 direction in FIG. 2) in which the sheet 4 is moved to the heating surface 3a side via the ventilation hole 3b by opening the vacuum tank 5, the sheet 4 is sucked to the heating surface 3a, thereby heating the sucked sheet 4 by the heater 31. Moreover, during heating, in the lower frame 2, by opening the vacuum tank 5 (FIG. 1) with respect to the lower frame 2 and performing the vacuum suction in a direction (an arrow P2 direction) in which the sheet 4 is moved downward via the ventilation hole 2b, the air of the accommodation space R at the lower side of the sheet 4 is sucked and decompressed in an arrow E1 direction, thereby obtaining the high degree of vacuum state. That is, by opening the vacuum tank 5 with respect to the lower frame 2 and the hot plate 3, the hot plate 3 is subjected to the vacuum suction in a direction in which the sheet towards the hot plate 3, and the inner space of the lower frame 2 is subjected to the vacuum suction in which the sheet towards the lower frame 2 and which is an opposite direction thereof.

Next, in the state of maintaining the decompression operation of the third process (the decompression process of the accommodation space), a fourth process (a mold releasing process of the hot plate and the sheet) is performed in which the adsorption operation of the sheet 4 to the hot plate 3 is stopped, and the portion between the hot plate 3 and the sheet 4 is opened to the atmosphere or the portion between the hot plate 3 and the sheet 4 is pressed toward the lower frame 2 side.

Specifically, after the sheet 4 adsorbed to the hot plate 3 is heated to a predetermined temperature and a predetermined time elapses, the vacuum suction of the hot plate 3 side is stopped and the adsorption operation is stopped. As a result, since the portion between the hot plate 3 and the sheet 4 is opened to the atmosphere, a pressure difference is generated between the upper and lower spaces with the sheet 4 interposed therebetween. That is, the pressure difference is generated in the space between the sheet 4 and the hot plate 3 and in the space between the sheet 4 and the base material 10 of the lower frame 2. For that reason, the sheet 4 softened by the heating is released from the heating surface 3a of the hot plate 3, is moved toward the concave surface 2c (the base material 10 side) of the lower frame 2 of the lower side of the sheet 4 in an arrow E2 direction (FIG. 3), and is pressed and bonded to the surface of the base material 10, whereby the molding product is completed.

In addition, after the fourth process (the mold releasing process of the hot plate and the sheet), the hot plate 3 is moved upward, the lower frame 2 is laterally moved together with the stand 6 shown in FIG. 1 and is moved from the lower position of the hot plate 3, and the completed base material 10 in the accommodation space R is taken out, whereby a series of molding operations is completed.

Furthermore, in the fourth process (the mold releasing process of the hot plate and the sheet), the portion between the hot plate 3 and the sheet 4 may be pressured as well as opened to the atmosphere. That is, by switching from the vacuum tank 5 shown in FIG. 1 to the pressurization tank 7 and performing pressing by ejecting the compressed air towards the lower frame 2 from the ventilation holes 3b of the hot plate 3, it is possible to increase the pressing force (the bonding force) of the sheet 4 to the base material 10.

In this manner, in the thermoforming method using the thermoforming device 1, by performing the decompression operation in the accommodation space R in the lower side of the sheet 4 together with the adsorption and heating operation of the sheet 4 in the hot plate 3, with the pressure difference between the upper and lower spaces with the sheet 4 interposed therebetween, it is possible to increase the movement speed of the sheet 4 toward the base material 10 side immediately after stopping the adsorption and heating operation. That is, since the pressing force of the sheet 4 to the base material 10 is increased, even when complex convex and concave shapes are present in the external form of the base material 10, it is possible to prevent air from staying between the convex and concave portion and the sheet 4.

Moreover, since a configuration is provided in which the heating surface 3a of the hot plate 3 is adsorbed to the sheet 4 and which does not depend on the radiation heating, there is no need for a chamber like the related art on the opposite base material side, and the decompression time on the upper side of the sheet 4 can be reduced, whereby the energy efficiency can be increased.

Furthermore, by adopting a contact type in which the sheet 4 adheres to the hot plate 3 instead of the upper one side radiation heating, the reduction in heating time can be promoted, and the temperature distribution over the entire surface of the sheet 4 is uniform, and thus the more reliable molding can be performed.

In addition, it is possible to solve the disadvantage of the related art that, in the case of providing a heater on the heating surface like the radiation heating of the related art, the pressure due to the pressing in the chamber is limited by durability of the heater, and the sufficient pressing force for bonding the sheet to the base material cannot be obtained.

Furthermore, a configuration is adopted in which the sheet 4 is adsorbed to the hot plate 3 during heating, and the sheet 4 does not hang to the lower side (the base material 10 side) due to the sheet 4 adhering to the heating surface 3a is softened and the growth is generated. Thus, there is no need for a complex management for keeping the horizontal maintenance of the sheet when softening the sheet in the vacuum pressure adjustment in the upper and lower chambers in the related art, and an easy and rapid vacuum decompression is possible.

In addition, the sheet 4 is adsorbed to the heating surface 3a of the hot plate 3 in the horizontal state before the heating, and the position of the printing of the sheet relative to the base material is not changed. Thus, the position of the print sheet is not shifted by the occurrence of the growth as in the related art, and it is possible to perform the positioning molding of the print sheet with high accuracy.

In addition, by automatically supplying the base material 10, the continuous molding through the roll sheet is also possible.

Furthermore, since the position of the heater 31 as the heating unit is the upper surface (the opposite side of the heating surface 3a), there is an advantage in that the wiring handling of the heater 31 is easy. That is, in the case of providing the heating unit such as a heater on the lower surface side like the radiation heating method of the related art, there is a need for wiring in the chamber, and there is a defect in that the sealing of the wiring is difficult and air leaks through the wiring hole when decompressing the chamber or the like. However, in the hot plate 3 according to the present embodiment, it is possible to eliminate the defect due to the leakage of the air.

Furthermore, since the sheet 4 adhered to the heating surface 3a, to which heat is transmitted, is heated by the heater 31 of the upper surface 3c of the hot plate 3, there is no influence of the air pressure received from the accommodation space R side to the heater 31. Thus, it is possible to press the inner portion of the accommodation space R with high pressure, whereby there is an advantage that the molding is performed in which the bonding force of the sheet 4 to the base material 10 is enhanced.

Furthermore, since the ventilation hole 2b provided in the lower frame 2 is placed in the outer periphery portion of the peripheral wall portion 21 side of the bottom portion 22 having less interference by the base material 10, it is possible to deal with the base materials of various shapes and sizes.

As mentioned above, in the thermoforming device and the thermoforming method using the hot plate heating according to the present embodiment, by increasing the movement speed of the sheet 4 toward the base material 10 side immediately after stopping the adsorption and heating operation by the hot plate 3, the pressing force of the sheet 4 to the base material 10 can be enhanced. Thus, even when the complex convex and concave shape is present in the external form of the base material 10, air does not stay between the convex and concave portion (reference numerals T1 to T4 shown in FIG. 3) and the sheet 4, and the reliable bonding is performed, whereby the high quality molding can be realized regardless of the shape of the base material.

Furthermore, by adopting the configuration in which the hot plate 3 directly adheres to the sheet 4, there is no need for the upper chamber like the related art, and the decompression time can be reduced. Thus, it is possible to reduce the cycle time taken for the molding to promote the efficiency of the molding, and the productivity can be improved.

As mentioned above, an embodiment of the thermoforming device and the thermoforming method using the hot plate heating according to the present invention has been described, but the present invention can be suitably changed within the scope of not departing from the gist thereof without being limited to only the embodiment mentioned above.

For example, in the present embodiment, the case of bonding the sheet 4 on the surface of the base material 10 is the application target, and the base material 10 is accommodated in the accommodation space R of the lower frame 2, but the present invention is not only limited thereto. Specifically, the shaping mold may be the application target in which the mold with the base material 10 and the lower frame 2 integrally provided is the application target. In the case of the shaping mold, the heating sheet is molded to the mold shape.

Furthermore, the "bonding" of the sheet to the base material according to the embodiment of the present invention also includes a case of peeling off the uppermost carrier film of the sheet by a transcription trimless and transferring only a decorative layer onto the base material as well as the case of a bonded molding which bonds the sheet itself to the base material 10 as in the present embodiment.

In the third process of the present embodiment, during the second process (the adsorption and heating operation by the hot plate 3), the inner portion of the accommodation space R is set to the vacuum state by the decompression operation of the lower frame 2. However, it is not only limited thereto, before the decompression operation of the accommodation space R, an operation of pressing the inner portion of the accommodation space R from the lower frame 2 may be performed. For example, when the time of the second process and the third process is 10 seconds, the first three seconds are performed by the pressing operation in the lower frame 2, and the seven seconds after that can be performed by the decompression operation. In this case, since the adsorption operation by the hot plate 3 and the pressing operation by the lower frame 2 act on the sheet 4, it is possible to more reliably bring the sheet 4 into close contact with the heating surface 3a of the hot plate 3.

Furthermore, in the present embodiment, the heater 31 is provided on the upper surface 3c of the hot plate 3, but a structure may be adopted in which the heater is embedded in the hot plate 3 without being only limited thereto.

Furthermore, in the present embodiment, the position of the ventilation hole 2b of the lower frame 2 is in the peripheral wall portion 21 of the bottom portion 22, but the position is not only limited thereto. For example, in the case of the mold mentioned above, the ventilation hole may be provided in the position communicating with the concave portion of the convex and concave portion forming the mold.

Furthermore, the shapes and the sizes of the lower frame 2, the hot plate 3 and the stand 6 according to the present embodiment, and the configuration of the fixing member or the like of the sheet 4 can be arbitrarily set.

In addition, in the embodiment mentioned above, the hot plate 3 is installed above the lower frame 2, the base material 10 side accommodated in the lower frame was described as the lower side, and the opposite side thereof was described as the upper side. However, it is also possible to install the lower frame (the upper frame) 2 above the hot plate 3 without being only limited thereto. In this case, after placing the sheet 4 on the hot plate 3, it is possible to perform the adherence between the hot plate 3 and the lower frame 2 with the sheet 4 interposed therebetween. Since the sheet 4 is supported by the hot plate 3, the sheet 4 can be reliably bonded to the hot plate 3 by the own weight of the sheet 4, whereby the uniform heating can be realized. In addition, even when the sheet 4 is softened, the sheet 4 can be horizontally supported by the hot plate 3, whereby it is possible to prevent the drooping or the like of the sheet 4. In this case, the decompression direction in the lower frame 2 and the decompression direction of the hot plate 3 are opposite directions of the decompression directions in the embodiment mentioned above respectively. That is, the accommodation space of the lower frame 2 is decompressed upward and the hot plate 3 is decompressed downward. In the case of pressing the portion between the sheet 4 and the hot plate 3 in the fourth process, the pressing direction is also changed from the lower direction to the upper direction.

In addition, it is suitably possible to replace the components of the embodiment mentioned above with the well-known components within the scope not departing from the gist of the present invention.

In an aspect of the present invention, after the sheet adsorbed to the hot plate is heated to a predetermined temperature and a predetermined time elapses, by stopping the adsorption operation of the hot plate side, the portion between the hot plate and the sheet is opened to the atmosphere or is compressed. Thus, a pressure difference is generated between the upper and lower spaces with the sheet interposed therebetween. For that reason, the sheet softened by the heating is away from the heating surface of the hot plate, is moved toward the lower side of the sheet, is pressed against the surface of the base material, and is bonded to the shaping mold or the base material. In this manner, by performing the decompression operation in the lower space of the sheet together with the adsorption and heating operation of the sheet in the hot plate, it is possible to increase the movement speed of the sheet toward the base material immediately after stopping the adsorption and heating operation by the pressure difference between the upper and lower spaces with the sheet interposed therebetween. That is, since the pressure force (shaping force in the case of the shaping mold) of the sheet relative to the base material is enhanced, even when the complex convex and concave shape is present in the external form of the base material, it is possible to prevent air from staying between the convex and concave portion and the sheet.

Moreover, since a configuration is provided in which the heating surface of the hot plate is adsorbed to the sheet and which does not depend on the radiation heating, there is no need for a chamber as in the related art on the opposite base material side, and the decompression time on the upper side of the sheet can be reduced, whereby the energy efficiency can be increased.

Furthermore, by adopting a contact type in which the sheet adheres to the hot plate instead of the upper one side radiation heating, the reduction in heating time can be promoted, and the temperature distribution over the entire surface of the sheet is uniform, and thus the more reliable molding and bonding can be performed.

In addition, it is possible to solve the disadvantage of the related art that, in the case of providing a heater on the heating surface like the radiation heating of the related art, the pressure due to the pressing in the chamber is limited by durability of the heater, and the sufficient pressing force for bonding the sheet to the base material cannot be obtained.

Furthermore, a configuration is adopted in which the sheet is adsorbed to the hot plate during heating, and the sheet does not hang to the lower side (the base material side) due to the sheet adhering to the heating is softened and the growth is generated. Thus, there is no need for a complex management for keeping the horizontal maintenance of the sheet when softening the sheet in the vacuum pressure adjustment in the upper and lower chambers in the related art, and an easy and rapid vacuum decompression is possible.

In addition, the sheet is adsorbed to the heating surface of the hot plate in the horizontal state before the heating, and the position of the printing of the sheet relative to the base material is not changed. Thus, the position of the print sheet is not shifted by the occurrence of the growth as in the related art, and it is possible to perform the positioning molding of the print sheet with high accuracy. In addition, by automatically supplying the base material, the continuous molding through the roll sheet is also possible.

In an aspect of the present invention, by being provided in the outer periphery portion of the peripheral wall portion side of the bottom portion having less interference by the base material, it is possible to deal with various shapes and sizes of base material.

In an aspect of the present invention, since the position of the heater of the heating unit is in the opposite side (the upper surface) of the heating surface of the hot plate, there is an advantage in that the wiring handling of the heater is easy. That is, in the case of providing the heating unit such as a heater on the lower surface side as in the radiation heating method of the related art, there is a need for wiring in the chamber, and there is a defect in that the sealing of the wiring is difficult and air leaks through the wiring hole when decompressing the chamber or the like. However, in the hot plate according to an aspect of the present embodiment, it is possible to eliminate the defect due to the leakage of the air.

Furthermore, since the sheet adhered to the heating surface, to which heat is transmitted, is heated by the heater of the upper surface of the hot plate, there is no influence of the air pressure received from the space side to the heater. Thus, it is possible to compress the inner portion of the space with high pressure, whereby there is an advantage that the molding is performed in which the bonding force of the sheet to the base material is enhanced.

In an aspect of the present invention, since the adsorption operation by the hot plate and the pressure action from the lower side (the same direction as the adsorption direction by the hot plate) of the sheet act on the sheet, it is possible to more reliably bring the sheet into close contact with the heating surface of the hot plate, thereby uniformly heating the entire surface of the sheet.

INDUSTRIAL APPLICABILITY

With the thermoforming device and the thermoforming method using the hot plate heating according to the embodiment of the present invention, the high quality molding can be realized regardless of the shape of the base material. Additionally, it is possible to realize the molding without the position deviation of the print sheet relative to the shape of the base material. In addition, it is possible to reduce the cycle time taken for the molding to promote the efficiency of the molding, whereby the productivity can be improved.

DESCRIPTION OF THE REFERENCE SYMBOLS

1 THERMOFORMING DEVICE
2 LOWER FRAME (FRAME)
2a FRAME UPPER EDGE PORTION (UPPER END OF PERIPHERAL WALL PORTION; TOP SURFACE)
2b VENTILATION HOLE
3 HOT PLATE
3a HEATING SURFACE
3b VENTILATION HOLE
3c UPPER SURFACE
4 SHEET
5 VACUUM TANK (DECOMPRESSION UNIT)
7 PRESSURIZATION TANK (PRESSURE UNIT)
10 BASE MATERIAL
21 PERIPHERAL WALL PORTION
22 BOTTOM PORTION (BASE PORTION)
31 HEATER (HEATING UNIT)
R ACCOMMODATION SPACE (SPACE; CONCAVE PORTION)

The invention claimed is:

1. A thermoforming device comprising:
a frame which has a base portion, a peripheral wall portion erected on a periphery of the base portion, and a concave portion formed by the base portion and the peripheral wall portion;
a hot plate which has a heating surface facing the concave portion of the frame and a heating unit that heats the heating surface, the hot plate being in contact with the heating unit;
a decompression unit which is connected to the frame, is configured to decompress an inner portion of the concave portion covered by a sheet, the sheet being fixed to an upper end of the peripheral wall portion of the frame, the decompression unit being connected to the hot plate, the decompression unit being configured to suck the heating surface side of the hot plate;
a unit which is connected to the hot plate and opens the heating surface side to an atmosphere or pressures the heating surface side; and
an adsorption and heating control unit which is configured to perform an adsorption and heating operation of the sheet by the hot plate.

2. The thermoforming device according to claim 1, wherein a ventilation hole is provided in an outer peripheral portion of the base portion of the frame.

3. The thermoforming device according to claim 1, wherein the heating unit is a heater which is provided on an opposite side of the heating surface of the hot plate.

4. The thermoforming device according to claim 2, wherein the heating unit is a heater which is provided on an opposite side of the heating surface of the hot plate.

* * * * *